Patented Sept. 3, 1946

2,406,837

UNITED STATES PATENT OFFICE 2,406,837

STABILIZED POLYVINYL FLUORIDE

Frederick L. Johnston, Claymont, Del., assignor to E. I. du Pont de Nemours & Company, Wilmington, Del., a corporation of Delaware No Drawing. Application November 19, 1943, Serial No. 510,962

2 Claims. (Cl. 260—88)

This invention relates to compositions comprising polyvinyl fluoride of improved heat stability, and more particularly to new and valuable molding compositions comprising polyvinyl fluoride.

The polymeric vinyl halides and their copolymers are subject to discoloration and decomposition under the influence of heat. For example, polyvinyl chloride shows marked evidence of decomposition at temperatures as low as 135° C. The minimum decomposition temperatures of vinyl chloride polymers can be raised to some degree by the addition of stabilizers. Many of these agents which are effective for polyvinyl chloride are not effective in the case of polyvinyl fluoride. A successful method for injection molding of the orientable, high molecular weight polyvinyl fluoride would in particular be desirable because of the high tensile strength and flexibility of this polymer. In spite of the fact that polyvinyl fluoride is a high softening polymer, it cannot, without modification as described herein, be suitably injection molded without evidences of decomposition. For example, even at 235° C. polyvinyl fluoride decomposes explosively in an injection molding press after 5 minutes heating. Gradual decomposition also occurs even at 200° C. after 15 or 20 minutes heating.

This invention has as an object the preparation of polyvinyl fluoride compositions of improved heat stability. A further object is the production of polyvinyl fluoride molding compositions comprising polyvinyl fluoride which are of especial value in the manufacture of polyvinyl fluoride articles by injection molding. Other objects will appear hereinafter.

The above objects are accomplished by incorporating with a polyvinyl fluoride a stabilizing agent comprising a small amount of a formaldehyde-reactive compound of the kind described hereinafter, and in the case of compositions particularly adapted for molding, by preparing an intimate mixture of the finely divided polymer and the stabilizing agent.

The formaldehyde-reactive compounds most advantageously used in the practice of this invention are nitrogen-containing compounds having a replaceable hydrogen attached to the nitrogen, e. g., primary and secondary amines and amides, and in particular the primary and secondary aliphatic amines and amides.

In the preferred practice of this invention polyvinyl fluoride is powdered and uniformly mixed by grinding with from 0.5% to 2% by weight based on the polyvinyl fluoride of a primary or secondary amine or amide which boils above the softening temperature of polyvinyl fluoride. Best results are obtained by using dicyclohexylamine as the stabilizing compound. Polyvinyl fluoride containing the stabilizers of this invention can be heated in a molding press for 5 minutes at 250° C. without any discoloration or decomposition, whereas in the absence of stabilizer polyvinyl fluoride darkens at 225° C. in 5 minutes and decomposes explosively at 235° C. after 5 minutes in a molding press.

The invention in the examples given herein has been illustrated in connection with orientable polyvinyl fluoride from which the most valuable products are obtained for the reasons previously given. This invention, however, by reason of the markedly greater heat stability conferred, is also useful in enhancing the utility of polyvinyl fluoride as ordinarily prepared. The orientable polyvinyl fluoride can be prepared by heating vinyl fluoride in the presence of an organic peroxy compound under a pressure above 150 atmospheres and at a temperature above the decomposition point of the peroxy compound and below that of the vinyl fluoride. In contrast with the non-orientable polymer which breaks after a stretching of a few per cent, a fused sample of the orientable polymer in the form of a film or filament when subjected to longitudinal stress in the solid state will permanently elongate at least 100% and up to 400% or more. Before orientation it shows an X-ray diffraction pattern characteristic of a crystalline powder, and after orientation it shows the pattern characteristic of an oriented fiber.

The invention is further illustrated by the following examples in which the parts are by weight.

*Example I*

One hundred parts of orientable polyvinyl fluoride are ground with 2 parts of urea until a uniformly mixed powder is obtained. A sample of this composition is tested for heat stability by pressing between aluminum foils in a Carver laboratory press (supplied by Fred S. Carver, New York city), at 250° C. for 5 minutes under 10,000 lbs./sq. in. pressure. When the sample is removed from the press and cooled, there is obtained a water-white film 0.025" thick which is completely fused by the molding process. There is no evidence of decomposition or discoloration.

A sample of the same polyvinyl fluoride containing no stabilizer heated in the molding press under the same conditions as above decomposes violently after 2 minutes leaving a charred black friable residue.

Example II

One hundred parts of orientable polyvinyl fluoride is ground with ½ part of dicyclohexylamine until a uniform powder is obtained. A sample of this powder is then pressed between aluminum foils in a Carver laboratory press at 250° C. for 5 minutes under 10,000 lbs./sq. in. pressure. A water-white film of the product completely fused by the molding process is obtained. The product shows no decomposition or discoloration.

Similarly, when 2 parts of the following compounds were uniformly mixed with 100 parts of polyvinyl fluoride, no decomposition or discoloration of the product occurred when molded for 5 minutes at 250° C. under 10,000 lbs./sq. in. pressure: Hexamethylene-bis-urea, biuret, monoacetylurea, monobenzylurea, cyanamide, dicyandiamide, diethylenetriamine, melamine, and furylamine.

Example III

One hundred parts of orientable polyvinyl fluoride is ground with 2 parts of urea until a uniform powder is obtained. This powder is pelleted by cold pressing at 15,000 lbs./sq. in. pressure and then chopped to pass a ⅜" screen. The product is injection molded in a De Mattia, one ounce capacity vertical injection molding machine (supplied by the De Mattia Machine and Tool Company, Clifton, New Jersey). The injection molding machine is fitted with a die capable of molding test pieces 5" x ½" x ⅛". With an injection cylinder wall temperature of 250° C. and at a pressure of 23,500 lbs./sq. in. on the injection piston, tough molded objects are obtained which are faithful reproductions of the die cavity and which show no discoloration or decomposition in comparison with the original molding powder.

Orientable polyvinyl fluoride containing no stabilizer and subjected to the same molding conditions decomposes violently when it comes in contact with the heating zone at 250° C.

Example IV

One hundred parts of orientable polyvinyl fluoride is ground with ½ part of dicyclohexylamine. The polyvinyl fluoride containing the dicyclohexylamine stabilizer is injection molded in a De Mattia machine as in Example III under a pressure of 25,300 lbs./sq. in. on the injection piston and with an injection cylinder wall temperature of 210° C. By this procedure tough molded objects of excellent appearance are obtained.

A method for obtaining the polyvinyl fluoride used in the foregoing examples is as follows:

A silver-lined reactor is swept with oxygen-free nitrogen and charged with 120 parts of deoxygenated water, 80 parts of pure methanol, and 0.2 part of benzoyl peroxide. It is then closed, nitrogen is removed by evacuation, and 100 parts of vinyl fluoride containing 20 P. P. M. of oxygen and a trace of acetylene (less than 50 P. P. M.) is admitted. The reactor is placed in a reciprocating agitator, fitted with temperature and pressure recording and controlling instruments, and connected through a valve to a source of additional monomeric vinyl fluoride of the same purity. Heating and agitation are begun, and when the temperature within the reactor reaches 78° C. additional vinyl fluoride is injected to raise the pressure in the system to 250 atmospheres. Reaction sets in and the temperature is maintained at 80° C. Monomeric vinyl fluoride is injected as rapidly as necessary to maintain the pressure at 250 atmospheres. After 15 hours the reaction is complete, 80% of the polymerization having occurred during the first 7 hours. The reactor is cooled, pressure is released, and the product is discharged. It is a friable white cake consisting of 62 parts of orientable polyvinyl fluoride after washing and drying.

In addition to the stabilizing agents mentioned in the examples formaldehyde-reactive compounds containing phenol groups can be employed, e. g., para-aminophenol. Other phenols can be used although those which do not contain a nitrogen having a replaceable hydrogen are not as effective as are nitrogen containing compounds.

The stabilizers are used in amounts from 0.25% to 2% by weight for best results. The proportions are usually within 0.1% to 5% since lower proportions give insufficient stabilizing effect for most purposes and with higher proportions compatibility with polyvinyl fluoride decreases and the molded products become weaker. The stabilizers can be incorporated in the polyvinyl fluoride by dissolving both the polyvinyl fluoride and the stabilizer in a mutual solvent and evaporating off the solvent. The stabilizer may also be incorporated by grinding it and the polyvinyl fluoride together, or they may be mixed on a mill. For ready incorporation into polyvinyl fluoride and to avoid volatilization during the molding process, the stabilizers should have a boiling point above the softening point of the polyvinyl fluoride.

The stabilizers which are effective for polyvinyl fluoride are unsatisfactory when applied to polyvinyl chloride. For example, polyvinyl chloride pressed between aluminum foils for 5 minutes at 175° C. under 10,000 lbs./sq. in. yields a film which shows a medium brown discoloration indicating a certain amount of decomposition. In this same test polyvinyl chloride containing 2 parts per hundred of magnesium stearate, a known stabilizer for polyvinyl chloride, remains light colored. When heated at 175° C. polyvinyl chloride containing 2 parts per hundred of hexamethylene-bis-urea gives a dark maroon, opaque film and polyvinyl chloride containing 2 parts per hundred of dicyclohexylamine heated in a press at this temperature gives a dark reddish-brown film flecked with black areas of complete decomposition illustrating that even at the lower temperatures these compounds, which are excellent heat stabilizers for polyvinyl fluoride, do not satisfactorily stabilize polyvinyl chloride against the influence of heat. Conversely, many compounds which are effective heat stabilizers for polyvinyl chloride, e. g., magnesium stearate, sodium carbonate and maleic anhydride are of no value in raising the temperature at which polyvinyl fluoride is subject to decomposition.

Stabilized polyvinyl fluorides of this invention find particular use in molded products since their decomposition temperature is sufficiently raised to enable them to be successfully injection and compression molded without discoloration or decomposition. These products are also useful in melt spinning of polyvinyl fluoride and in calendering operations where temperatures above 200° C. are used.

As many apparently widely different embodiments of this invention may be made without departing from the spirit and scope thereof, it is to be understood that I do not limit myself to the specific embodiments thereof except as defined in the appended claims.

I claim:
1. A composition of matter comprising poly- vinyl fluoride which is stable against discoloration and decomposition when heated 5 minutes at 225° C., said composition comprising polyvinyl fluoride having dicyclohexylamine intimately dispersed therethrough in amount of 0.1% to 5% by weight of the polyvinyl fluoride.

2. A molding powder comprising finely divided orientable polyvinyl fluoride having dicyclohexylamine intimately dispersed therethrough in amount of 0.1% to 5% by weight of the polyvinyl fluoride, said polyvinyl fluoride being characterized in that it is capable of being permanently elongated at least 100% under longitudinal stress.

FREDERICK L. JOHNSTON.